US008549475B1

(12) United States Patent
Cameron (10) Patent No.: US 8,549,475 B1
(45) Date of Patent: Oct. 1, 2013

(54) SYSTEM AND METHOD FOR SIMPLIFYING OBJECT-ORIENTED PROGRAMMING

(75) Inventor: Stefan Cameron, Ottawa (CA)

(73) Assignee: Adobe Systems Incorporated, San Jose, CA (US)

( * ) Notice: Subject to any disclaimer, the term of this patent is extended or adjusted under 35 U.S.C. 154(b) by 1385 days.

(21) Appl. No.: 12/210,554

(22) Filed: Sep. 15, 2008

Related U.S. Application Data

(60) Provisional application No. 61/079,062, filed on Jul. 8, 2008.

(51) Int. Cl.
*G06F 9/44* (2006.01)

(52) U.S. Cl.
USPC .......................... 717/124; 717/116; 717/126

(58) Field of Classification Search
None
See application file for complete search history.

(56) References Cited

U.S. PATENT DOCUMENTS

| | | | | |
|---|---|---|---|---|
| 5,737,609 | A * | 4/1998 | Reed et al. | 717/126 |
| 6,446,256 | B1 * | 9/2002 | Hyman et al. | 717/143 |
| 6,620,204 | B1 * | 9/2003 | Malcolm | 715/209 |
| 6,934,934 | B1 * | 8/2005 | Osborne et al. | 717/126 |
| 6,993,747 | B1 * | 1/2006 | Friedman | 717/124 |
| 7,165,240 | B2 * | 1/2007 | Patterson | 717/116 |
| 7,287,242 | B2 * | 10/2007 | Chang | 717/124 |
| 7,334,219 | B2 * | 2/2008 | Cebula et al. | 717/124 |
| 7,475,384 | B2 * | 1/2009 | Heath et al. | 717/116 |
| 7,587,661 | B2 * | 9/2009 | Bell et al. | 714/799 |
| 7,797,680 | B2 * | 9/2010 | Haas | 717/124 |
| 7,827,438 | B2 * | 11/2010 | Tarta | 717/124 |
| 7,971,090 | B2 * | 6/2011 | Nan et al. | 717/124 |
| 2002/0194219 | A1 * | 12/2002 | Bradley et al. | 707/506 |
| 2005/0210263 | A1 * | 9/2005 | Levas et al. | 713/182 |
| 2005/0283761 | A1 * | 12/2005 | Haas | 717/124 |
| 2006/0248451 | A1 * | 11/2006 | Szyperski et al. | 715/513 |
| 2006/0291398 | A1 * | 12/2006 | Potter et al. | 370/241 |
| 2006/0294509 | A1 * | 12/2006 | Mital et al. | 717/116 |
| 2007/0113168 | A1 * | 5/2007 | de Souza et al. | 715/507 |
| 2007/0168849 | A1 * | 7/2007 | Bell et al. | 714/799 |
| 2007/0168949 | A1 * | 7/2007 | Shattuck et al. | 717/115 |
| 2008/0010629 | A1 * | 1/2008 | Berg et al. | 717/116 |
| 2008/0126925 | A1 * | 5/2008 | Haven et al. | 715/235 |
| 2008/0276225 | A1 * | 11/2008 | Saterdag et al. | 717/127 |

OTHER PUBLICATIONS

Selvi et al., "A Self-Regulated Learning Approach for Programming Language Using Cloud-based Learning Management System", 2012 IEEE, pp. 191-196; <http://ieeexplore.ieee.org/stamp/stamp.jsp?tp=&arnumber=6206810>.*
Bergin et al., "Examining the Role of Self-Regulated Learning on Introductory Programming Performance", 2005 ACM, ICER'05, Oct. 1-2, 2005, Seattle, Washington, USA, pp. 81-86; <http://dl.acm.org/citation.cfm?id=1089794>.*
Mahesh Babu Mungara, "A Method for Systematically Generating Tests from Object-Oriented Class Interfaces", 2003 Virginia Polytechnic Institute & State University, Blacksburg, Virginia, USA, pp. 1-76; <http://scholar.lib.vt.edu/theses/available/etd-10252003-144535/unrestricted/Thesis.pdf>.*

* cited by examiner

*Primary Examiner* — Thuy Dao
*Assistant Examiner* — Ben C Wang
(74) *Attorney, Agent, or Firm* — Schwegman Lundberg Woessner P.A.

(57) ABSTRACT

A method of improving an object-oriented programming environment by creating objects that automatically test themselves to determine if the object is being used properly. Each programming object in a library of programming objects includes an initialization routine for testing the programming object. If the initialization routine detects an programmer errors in the use of the programming object, the initialization routine will display a message describing the detected error.

15 Claims, 9 Drawing Sheets

SYSTEM AND METHOD FOR SIMPLIFYING OBJECT-ORIENTED PROGRAMMING

CROSS REFERENCE TO RELATED APPLICATIONS

This application claims the benefit of U.S. Provisional Patent Application Ser. No. 61/079,062 filed Jul. 8, 2008 ("SYSTEM AND METHOD FOR SIMPLIFYING OBJECT-ORIENTED PROGRAMMING"), which is herein incorporated by reference in its entirety.

TECHNICAL FIELD

The present disclosure relates to the field of computer software development environments. In particular, but not by way of limitation, this document discloses techniques for providing computer software development tools to computer software developers that aid in the rapid location of potential errors within a computer program currently in development.

BACKGROUND

Computer software development is a notoriously difficult task that has been the subject of much study. Specifically, it is very difficult to ensure that a particular computer program is completely free of errors (more commonly known as 'bugs' in the field of computer software). Although there has been some work done on creating methods of 'proving' that a particular computer program is free of bugs, such methods are generally only applicable to small simple computer programs. Most computer software development projects instead rely upon more imperfect methods of testing computer programs to locate (and subsequently remedy) bugs in computer programs.

Computer software is developed with the help of software development tools such as source code editors, source code to object code compilers, object code linkers, and object code debuggers. The better that computer software development tools become, the faster that computer software developers can develop computer programs and the more reliable those computer programs will be. Thus, great amounts of investment has been put into creating computer software development tools that allow computer software developers to create computer software in the most efficient and reliable manner.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are mainly disclosed with reference to an embodiment wherein JavaScript code is embedded within eXtensible Mark-up Language (XML) code, the teachings of the disclosed system can be used with other types of programming development environments. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
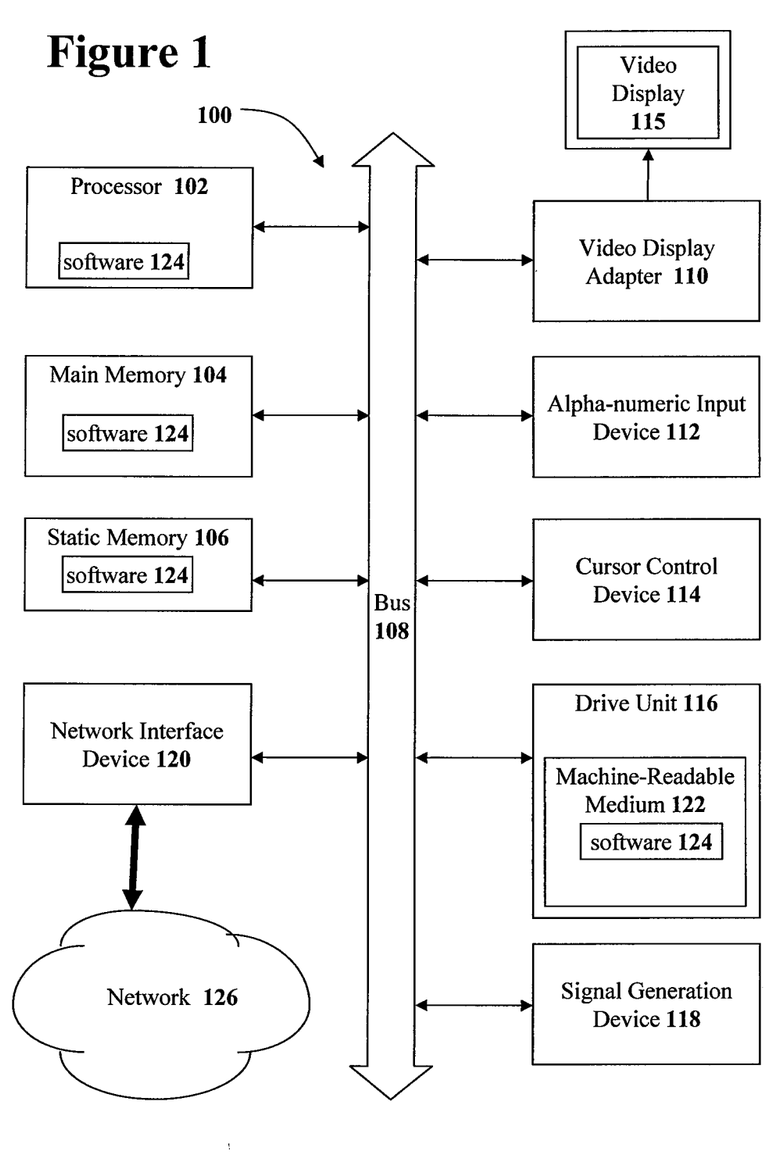
FIG. 1 illustrates a diagrammatic representation of machine in the example form of a computer system within which a set of instructions, for causing the machine to perform any one or more of the methodologies discussed herein, may be executed.

FIG. 1 illustrates a diagrammatic representation of a machine in the example form of a computer system 100 within which a set of instructions 124 may be executed for causing the machine to perform any one or more of the methodologies discussed herein. In a networked deployment, the machine may operate in the capacity of a server computer or a client computer in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network server, a network router, a network switch, a network bridge, or any machine capable of executing a set of instructions (sequential or otherwise) that specify actions to be taken by that machine. Further, while only a single machine is illustrated in FIG. 1, the term "machine" shall also be taken to include any collection of machines that individually or jointly execute a set (or multiple sets) of instructions to perform any one or more of the methodologies discussed herein. Furthermore, a single machine may be used to designate a cluster of computer systems that are all assigned to provide the same computer service.

The example computer system 100 illustrated in FIG. 1 includes a processor 102 (e.g., a central processing unit (CPU), a graphics processing unit (GPU) or both), a main memory 104, and a static memory 106 that may communicate with each other via a bus 108. The computer system 100 may further include a video display adapter 110 that drives a video display system 115 such as a Liquid Crystal Display (LCD) or a Cathode Ray Tube (CRT). The example computer system 100 also includes an alphanumeric input device 112 (e.g., a keyboard), a cursor control device 114 (e.g., a mouse or trackball), a disk drive unit 116, a signal generation device 118 (e.g., such as a sound system for driving a speaker), and a network interface device 120. Note that various embodiments of a computer system will not always include all of these peripheral devices.

The disk drive unit 116 includes a machine-readable medium 122 on which is stored one or more sets of computer instructions and data structures (e.g., instructions 124 also known as 'software') embodying or utilized by any one or more of the methodologies or functions described in this document. The computer instructions 124 may also reside, completely or at least partially, within the main memory 104, the static memory 106, and/or within the processor 102 during execution thereof by the computer system 100. Thus, the main memory 104, static memory 106, and the processor 102 also constituting machine-readable media.

The computer instructions 124 for operating computer system 100 may be transmitted or received over a computer network 126 via the network interface device 120 utilizing any one of a number of well-known transfer protocols such as the File Transfer Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, flash memory, and magnetic media.

For the purposes of this specification, the term "module" includes an identifiable portion of computer code, computational or executable instructions, data, or computational object to achieve a particular function, operation, processing, or procedure. A module need not be implemented in software; a module may be implemented in software, hardware/circuitry, or a combination of software and hardware.

Computer Software Development

Figure 2:
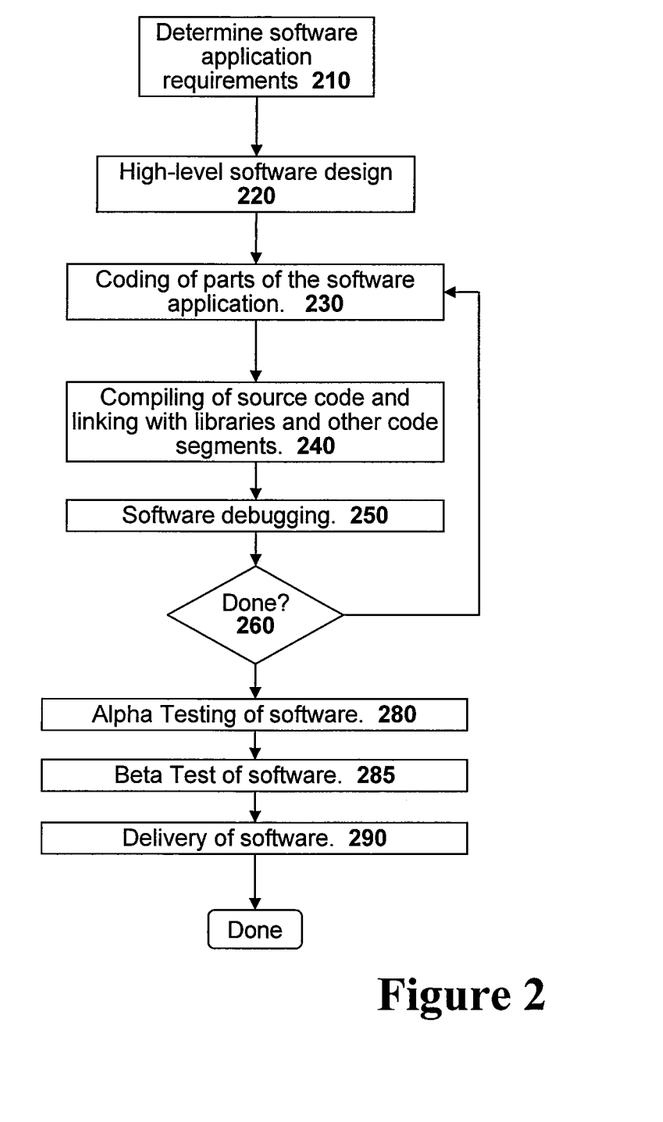
FIG. 2 illustrates a simplified flow diagram of how computer software development often occurs.

FIG. 2 illustrates a simplified flow diagram of how software development often occurs. Note that FIG. 2 is just a high-level over view and that most of the stages are often repeated in an iterative manner causing a software application to evolve during its development. Initially, at stage 210, the functional requirements of a new software application are determined. This may be performed by asking potential customers about their needs and desires.

Next, at stage 220, the new software application is designed at a high-level. Various functional blocks are defined, interfaces between the various functional are designed, and required data structures are defined. Stage 220 generally involves drawing block diagrams and writing design specifications.

Then at stage 230, the actual coding (programming) begins. Programmers use the diagrams and design specifications from the earlier stages to guide their programming efforts. As variously functional blocks of code are completed, those code sections may be tested. Specifically, stage 240 indicates that segments of source code may be compiled and linked with code libraries (such as from the operating system or standard existing libraries) and other code segments of the application program under development. The compiled code may then be debugged at stage 250 by executing the code the intended execution environment or in a debugging aid such as an emulator.

At stage 260, the programmer determines if the application program is complete. If the programmer determines that the application program is sufficiently complete, then the software application will begin formal testing at stage 280. However, software developers then tend to repeat stages 230, 240, and 250 and progressively refine the software application until the software application is complete. During each iteration more and more features and components may be added to the application program. Note that software application requirements from stage 210 and the design documents from stage 220 may change during development thus further complicating the software development.

Testing of the (nearly) complete software application begins at stage 280 where 'alpha' testing occurs. This generally takes place within the same company by designated software testers who act as the intended software users. Automated regression testing also occurs in attempts to stress the software application heavily. When the software application has completed alpha testing, the software application may then enter a 'beta' testing phase at stage 285. Beta testing often occurs with real customers that have volunteered to test the software generally under the terms of a non disclosure agreement. After completing beta testing, the final software application is delivered at stage 290.

As can be seen from the software development process of FIG. 2, the iterative development and testing stages 230, 240, and 250 are at the core of computer software development. Any improvements to that area of the software development process can greatly reduce software development times and improve software reliability.

Object-Oriented Programming.

Object-oriented programming (OOP) is a computer programming methodology that uses individual software "objects" to design and develop computer programs. Object-oriented programming was created in an attempt to improve computer software quality by strongly emphasizing discrete units of programming logic and re-usability of computer software. Thus, once a particular discrete unit of programming logic, an object, was completely developed and fully debugged, that object could be easily re-used. Thus, using object-oriented programming, programmers can more quickly develop large sophisticated applications by putting together many previously created and de-bugged programming objects.

The object-oriented programming environment may be seen as a collection of cooperating objects, as opposed to a traditional programming view in which a program may be seen as a collection of individual subroutines organized to achieve an over all goal. In object-oriented programming, an object is generally an encapsulated collection data and code (often referred to as 'methods') that operates on the data. Each programming object is generally capable of receiving messages, processing data, and sending messages to other programming objects.

Each programming object may be viewed as an independent entity with a distinct set of responsibilities. The actions or "operators" on the objects are closely associated with the object. For example, in object oriented programming, individual data structures are generally closely associated with the set of operations that may be performed on the data structures. Specifically, a data structure and a set of operations on that data structure may be combined together into a distinct programming object. In the more traditional computer programming approaches data and operations are viewed separately.

Self-Regulating Objects

As set for above, object-oriented programming has been used to improve the speed of software development and the reliability of the created computer programs. However, computer programmers can still very easily create many different types of programming errors (generally known as "bugs" in computer parlance) with object-oriented programming. For example, programmers may supply the wrong data to a programming object such that the programming object cannot operate as intended. Another possible error that a programming may commit is providing all of the needed information needed to properly create a new instantiation of a particular programming object. Thus, although object-oriented programming has greatly improve computer programming, there are still a nearly infinite number of errors a programmer can make.

To improve upon object-oriented programming, the disclosed system introduces the concept of self-regulating programming objects. A self-regulating programming object takes advantage of the fact that each object in an object-oriented programming environment includes programming code. Specifically, a self-regulating programming object includes programming code segments that attempt to check if a programmer using a programming object has used the programming object properly. If the programming code within the object detects any improper usage of the programming object, that programming code may alert the programmer. In addition, the visual appearance of the programming object will be modified in order to alert the programmer of the error. Note that the rest of the programmer's work will continue to operate normally such that the programmer can continue to debug other aspects of the programmer's work.

To best illustrate the concept, an example will be provided. Although the example will be provided using one specific object-oriented programming environment, the techniques can be applied to any object-oriented programming.

The XML Forms Architecture

The eXtensible Mark-up Language (XML) is a general-purpose specification for creating custom mark-up languages. XML is classified as an extensible language because XML allows mark-up language creators to define their own elements. XML has been used to create many different mark-up languages for various application specific tasks. Although XML is a programming language itself, XML documents may include other executable code such as JavaScript code.

Adobe Systems Incorporated of San Jose, Calif. used XML to create the XML Forms Architecture (XFA), an XML-based language for the creation of forms such as entry forms in a computer program or a paper document. The XML Forms Architecture is an object-oriented environment wherein forms may be created from individual XML Form Objects (XFOs). The XML Form Objects (or sub-forms) follow a defined object format set forth in the document "Adobe XML Form Object Model Reference" which is hereby incorporated by reference.

To speed the creation of XFA form documents, a library of pre-created XML Form Objects (XFOs) is provided to form designers. Form designers may quickly create XFA form documents by combining several individual pre-made XML Form Objects together. In one embodiment, a graphical form design program known as LiveCycle® Designer allows a form designer to select individual XML Form Objects from menus and graphically place those XML Form Objects on a graphically displayed form page. When the form designer is satisfied with a graphically designed from, then the graphical form design program outputs the XML code required to create the form graphically illustrated within the graphical form design program.

As set forth earlier, XML allows other programming code to be inserted within XML code. Within one embodiment of the XML Forms Architecture (XFA) environment, two different types of additional programming code are supported: FormCalc and JavaScript. FormCalc is a calculation language created by Adobe Systems and JavaScript is a well-known powerful scripting language. The programming code within XML Form Objects allows these objects to operate on their own associated data or communicate with other objects.

An Initialization Routine with XML Form Objects

To simplify the task of designing properly operating forms in the XML Forms Architecture, the disclosed system proposes including special initialization code within various XML Form Objects. The initialization code performs any possible tests to determine if the XML Form Object (XFO) has been used properly. If the initialization code determines that form designer did not properly utilize the XFO, then the initialization code will display information specifying what the problem is. In addition to displaying such information during run-time, a graphical representation may also include information that will remind the form designer how to use the XFO properly.

Figure 3A:
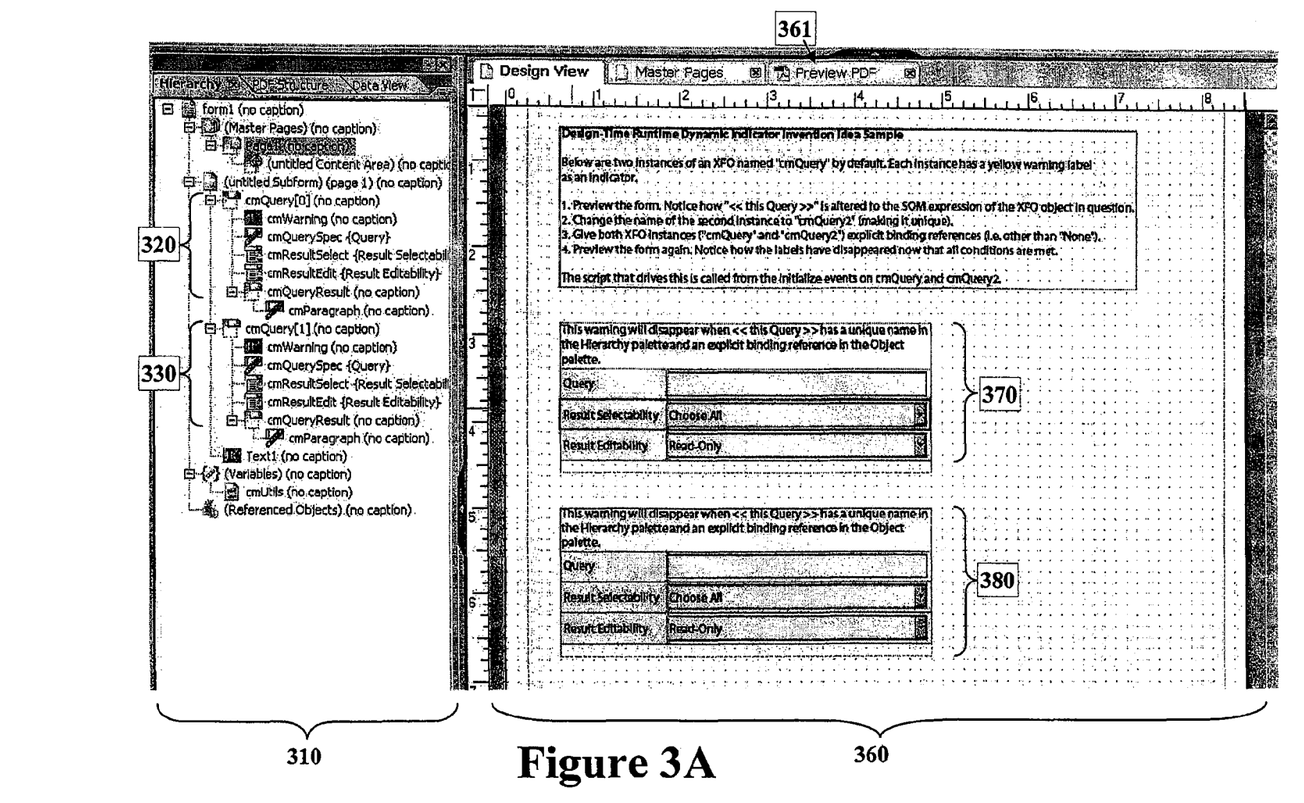
FIG. 3A illustrates a screenshot portion of an example embodiment of a graphical form designer program that allows a designer to create forms graphically using pre-made XML Form Objects (XFOs) selected from various menus.

FIG. 3A illustrates a portion of a screenshot from one example embodiment of a graphical form designer program that allows a person designing forms to graphically create forms using pre-made XML Form Objects (XFOs) selected from various menus (not shown). In the screenshot portion of FIG. 3A, the left-side 310 of the image displays a hierarchical display of the various form objects and the right-side 360 of the image displays a graphical design view of the various form objects used to create a XFA form document.

In the example XFA form document of FIG. 3A, there are two query objects: cmQuery[0] and cmQuery[1]. The 'cmQuery' is the default name of this type of form object and each has been given a numbered suffix in order to distinguish between the two. On the left-side 310 of the display the form objects are displayed in the object hierarchy as cmQuery[0] 320 and cmQuery[1] 330. Note that, in this example, each of the query objects 320 and 330 includes enclosed sub objects within the query objects such as cmQuerySpec, cmResultSelect, and cmResultEdit. On the right-side 360 of the display the forms are graphically displayed on the designed form as cmQuery[0] 370 and cmQuery[1] 380. Note that there does not need to be such a correlated display in order to practice teachings of the disclosed system.

Figure 3B:
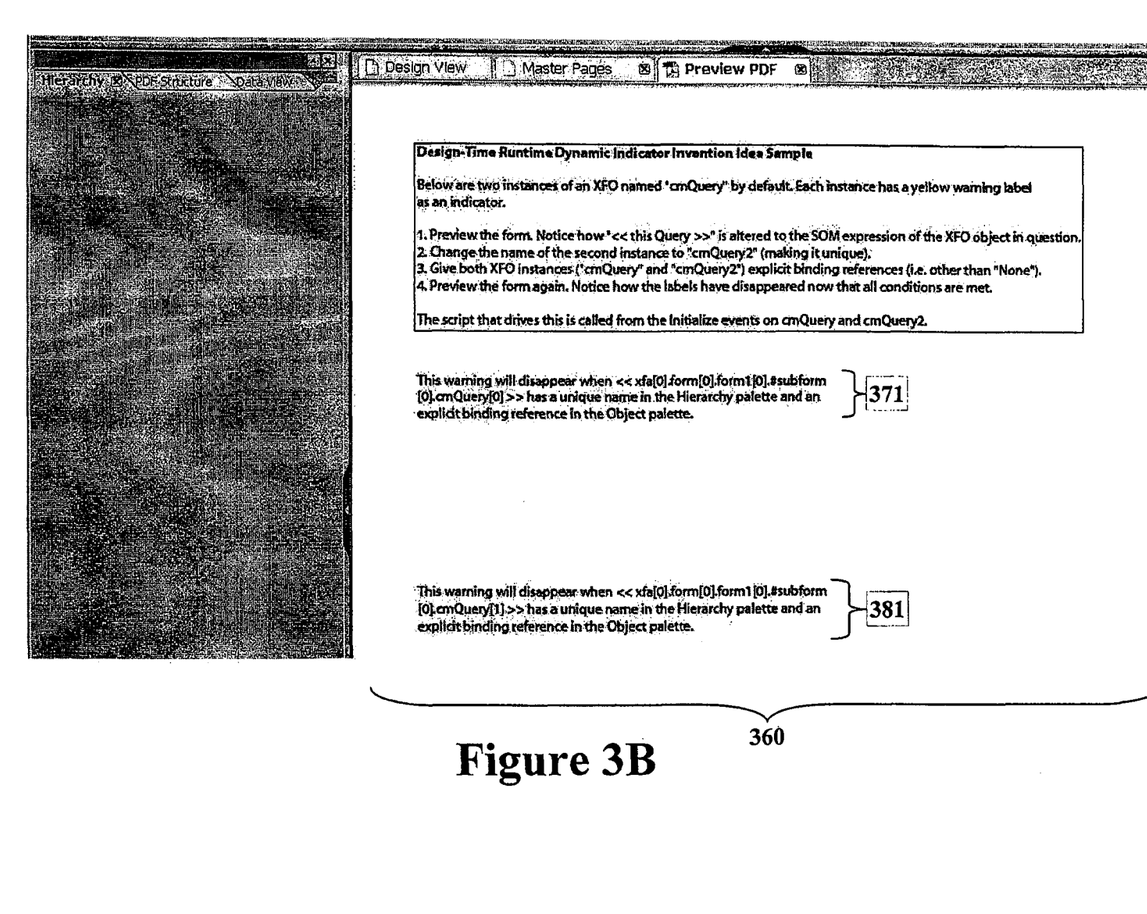
FIG. 3B illustrates a preview rendering of the form being designed in FIG. 3A.

In this example, there are two detectable requirements for a form designer to use a cmQuery type of object properly. Specifically, the form designer must assign a unique name to each cmQuery type of object and the form designer must give each cmQuery a binding (there is no default binding for such cmQuery objects). Note that these requirements are explicitly set forth in the graphical view of the cmQuery objects 370 and 380 in FIG. 3A to warn the form designer. The warning states "This warning will disappear when <<this Query>> has a unique name in the Hierarchy palette and an explicit binding reference in the Object palette." If a user does not heed these warnings, a preview or an actual use of the form will display the warning. For example, FIG. 3B illustrates a preview rendering of the XFA form document wherein the warning messages 371 and 381 are displayed in the right-side 360. Note that the warning messages 371 and 381 display the actual full object name in the preview of FIG. 3B. Specifically, warning message 371 indicates that the object named "xfa[0].forms[0].form1[0].#subform[0].cmQuery[0]" has an error and warning message 381 indicates that the object named "xfa[0].forms[0].form1[0].#subform[0].cmQuery[1]" has an error.

The following XML defines the cmQuery object. At the beginning of the code for the object is an 'initialize' routine that is called to initialize the object. This initialize code calls a "cmUtils.CmQueryControl( )" routine that will test whether forms designer is properly using the object.

Code Listing 1 - cmQuery Object XML code

```xml
<subform layout="tb" name="cmQuery" x="9.525mm" y="66.675mm">
    <bind match="none"/>
    <event activity="initialize">
        <script contentType="application/x-javascript">
// On initialize at run-time (including preview) hide the design-time controls
cmUtils.CmQueryControl(this); /*Determine if warning should be hidden*/
cmQuerySpec.presence = "hidden";   /*Hide QuerySpec object */
cmResultSelect.presence = "hidden";   /*Hide ResultSelect object *
cmResultEdit.presence = "hidden";   /*Hide ResultEdit object *
</script>
    </event>
    <draw name="cmWarning" w="107.95mm" minH="0mm">
        <ui>
          <textEdit>
          </textEdit>
        </ui>
        <value>
          <text>This warning will disappear when << this Query >> has a unique
name in the Hierarchy palette and an explicit binding reference in the Object palette.</text>
        </value>
        <font typeface="Myriad Pro"/>
        <margin topInset="0.5mm" bottomInset="0.5mm" leftInset="0.5mm" rightInset="0.5mm"/>
        <border>
          <edge presence="hidden"/>
          <fill>
            <color value="255,255,221"/>
          </fill>
        </border>
    </draw>
    <field name="cmQuerySpec" w="107.95mm" h="9mm" access="readOnly">
        <bind match="none"/>
        <ui>
          <textEdit multiLine="1">
            <border>
              <edge stroke="lowered">
              </edge>
            </border>
            <margin/>
          </textEdit>
        </ui>
        <font typeface="Myriad Pro"/>
        <margin topInset="1mm" bottomInset="1mm" leftInset="1mm" rightInset="1mm"/>
        <para vAlign="middle"/>
        <caption reserve="30mm">
          <font typeface="Myriad Pro"/>
          <para vAlign="middle"/>
          <value>
            <text>Query</text>
          </value>
        </caption>
        <border>
          <edge presence="hidden"/>
          <fill>
            <color value="238,238,238"/>
          </fill>
        </border>
        <event activity="initialize">
          <script contentType="application/x-javascript">
// Enter the query specification here:
this.rawValue =
"<cmQuery>" +
"" +
"</cmQuery>"</script>
```

-continued

Code Listing 1 - cmQuery Object XML code

```xml
    </event>
  </field>
  <field name="cmResultSelect" w="107.95mm" h="9mm" access="readOnly">
    <bind match="none"/>
    <ui>
      <choiceList>
        <border>
          <edge stroke="lowered">
          </edge>
        </border>
        <margin/>
      </choiceList>
    </ui>
    <font typeface="Myriad Pro"/>
    <margin topInset="1mm" bottomInset="1mm" leftInset="1mm" rightInset="1mm"/>
    <para vAlign="middle"/>
    <caption reserve="30mm">
      <font typeface="Myriad Pro"/>
      <para vAlign="middle"/>
      <value>
        <text>Result Selectability</text>
      </value>
    </caption>
    <border>
      <edge presence="hidden"/>
      <fill>
        <color value="238,238,238"/>
      </fill>
    </border>
    <value>
      <text>chooseAll</text>
    </value>
    <items>
      <text>Choose All</text>
      <text>Choose One</text>
      <text>Choose Any</text>
    </items>
    <items save="1" presence="hidden">
      <text>chooseAll</text>
      <text>chooseOne</text>
      <text>chooseAny</text>
    </items>
  </field>
  <field name="cmResultEdit" w="107.95mm" h="9mm" access="readOnly">
    <bind match="none"/>
    <ui>
      <choiceList>
        <border>
          <edge stroke="lowered">
          </edge>
        </border>
        <margin/>
      </choiceList>
    </ui>
    <font typeface="Myriad Pro"/>
    <margin topInset="1mm" bottomInset="1mm" leftInset="1mm" rightInset="1mm"/>
    <para vAlign="middle"/>
    <caption reserve="30mm">
      <font typeface="Myriad Pro"/>
      <para vAlign="middle"/>
      <value>
        <text>Result Editability</text>
      </value>
    </caption>
    <border>
      <edge presence="hidden"/>
      <fill>
        <color value="238,238,238"/>
      </fill>
    </border>
    <value>
      <text>readOnly</text>
    </value>
    <items>
      <text>Read-Only</text>
      <text>Editable</text>
    </items>
    <items save="1" presence="hidden">
```

Code Listing 1 - cmQuery Object XML code

```xml
        <text>readOnly</text>
        <text>editable</text>
      </items>
    </field>
    <subform name="cmQueryResult" layout="tb">
      <occur min="0" max="-1"/>
      <bind match="dataRef" ref="queryResult[*]"/>
      <field name="cmParagraph" access="readOnly">
        <bind match="dataRef" ref="paragraph"/>
        <ui>
          <textEdit multiLine="1">
            <border presence="hidden">
              <?templateDesigner StyleID aped0?></border>
            <margin/>
          </textEdit>
        </ui>
        <font typeface="Myriad Pro"/>
        <margin topInset="0mm" bottomInset="0mm" leftInset="0mm" rightInset="0mm"/>
        <value>
          <exData contentType="text/html">
            <body xmlns="http://www.w3.org/1999/xhtml"
xmlns:xfa="http://www.xfa.org/schema/xfa-data/1.0/" xfa:APIVersion="2.6.7185.0"><p><span style="xfa-spacerun:yes"> </span></p></body>
          </exData>
        </value>
      </field>
      <?templateDesigner expand 1?></subform>
    <!-- end of cmQueryResult -->
    <?templateDesigner expand 1?></subform>
```

The following section of code sets forth the cmUtils.CmQueryControl( ) routine that will test whether forms designer is properly using the object. In this example, the code is in JavaScript and the bolded code section tests whether the object has been given a unique name and whether a binding has been assigned to the object. If these conditions are met, then the warning message will be hidden. Otherwise, the warning will appear when the code is previewed or executed.

Code Listing 2 - CmQueryControl and supporting code

```javascript
/**
* Controls the visibility of the cmWarning text object found within the specified
* container subform. If the container has a unique name and an explicit binding,
* the cmWarning child of containerSF is hidden. Otherwise, the placeholder within
* containerSF.cmWarning is replaced with the SOM expression for containerSF.
*/
function CmWarningControl(containerSF, placeholder)
{
// Only hide warning if containerSF subform has a unique name and explicit binding
// (we can't verify the uniqueness of the binding reference however we can ensure that
// the binding is explicit).
    if (containerSF == null || containerSF.cmWarning == null) return;
// Test if object given a unique name and a binding has been set.
    if (containerSF.parent.resolveNode(containerSF.name + "[1]") == null &&
        containerSF.bind.match == "dataRef" && containerSF.bind.ref != "")
    {
        // All conditions met, so hide the warning message
        containerSF.cmWarning.presence = "hidden";
    }
    else if (placeholder && placeholder.length > 0)
    {
        // All conditions not met, so identify the cmContent name inside the warning message.
        var warning = containerSF.cmWarning.rawValue;
        var pos = warning.indexOf(placeholder);
        if (pos >= 0)
        {
            warning = warning.substr(0, pos) + "<< " + containerSF.somExpression + " >>" +
                warning.substr(pos + placeholder.length);
            containerSF.cmWarning.rawValue = warning;
        }
    }
}
/**
* Controls the visibility of the warning label inside a CM Query subform, the editability
* (in the Form Guide) of query results and adjusts the width of the query results (paragraphs)
* to fit within the letter.
```

-continued

Code Listing 2 - CmQueryControl and supporting code

```
*/
function CmQueryControl(cmQuery)
{
    // Make sure the object is not null
    if (cmQuery == null) return;
    // Test the non null object
    if (cmQuery.cmWarning)
        CmWarningControl(cmQuery, "<< this Query >>");
}
```

Figure 3C:
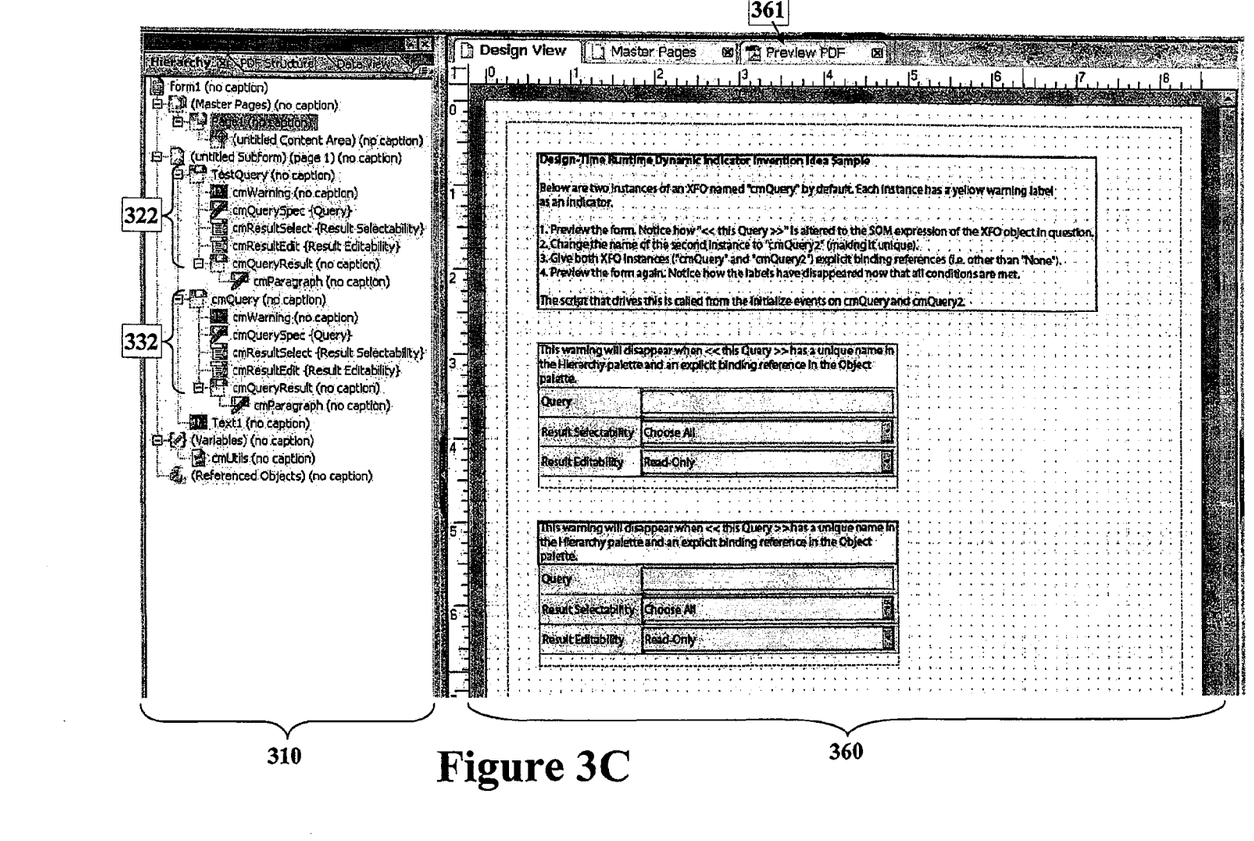
FIG. 3C illustrates the form being designed in FIG. 3A wherein one of the objects in the form has been renamed.
Figure 3D:
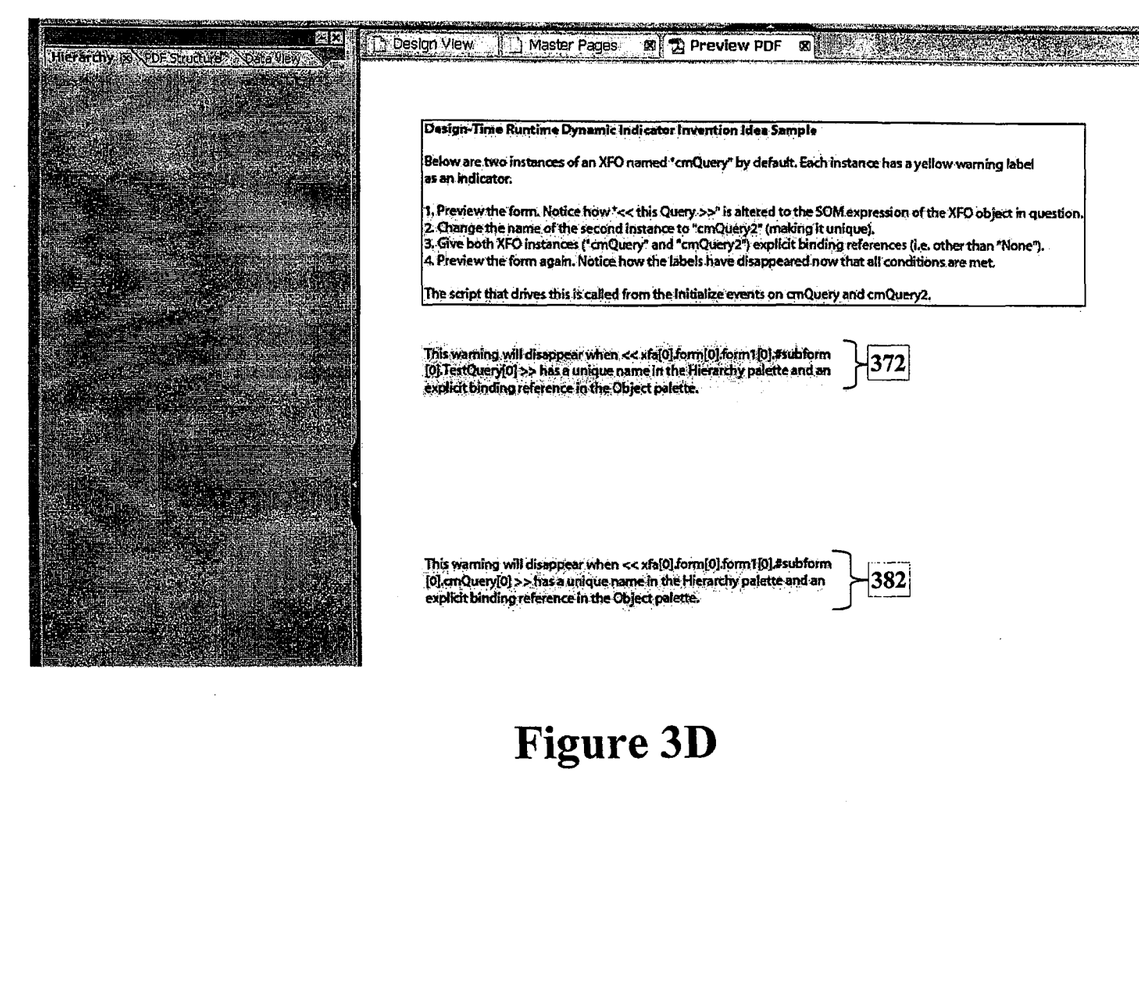
FIG. 3D illustrates a preview rendering of the form being designed in FIG. 3C.

Note that in example presented above, both conditions (a unique object name and an assigned binding) must be met in order to hide the warning message intended to help the programmer. FIG. 3C illustrates the form designer program screen shot of FIG. 3A wherein the first cmQuery object 322 has now been assigned the name "TestQuery" (but no binding has been assigned). If the preview tab 361 is selected, the preview appears as illustrated in FIG. 3D wherein both warning messages still appear. Note that warning message 372 does now specify the new name of the query ("xfa[0].forms[0].form1[0].#subform[0].TestQuery[0]") in the object reference path displayed in the warning message 372.

Figure 3E:
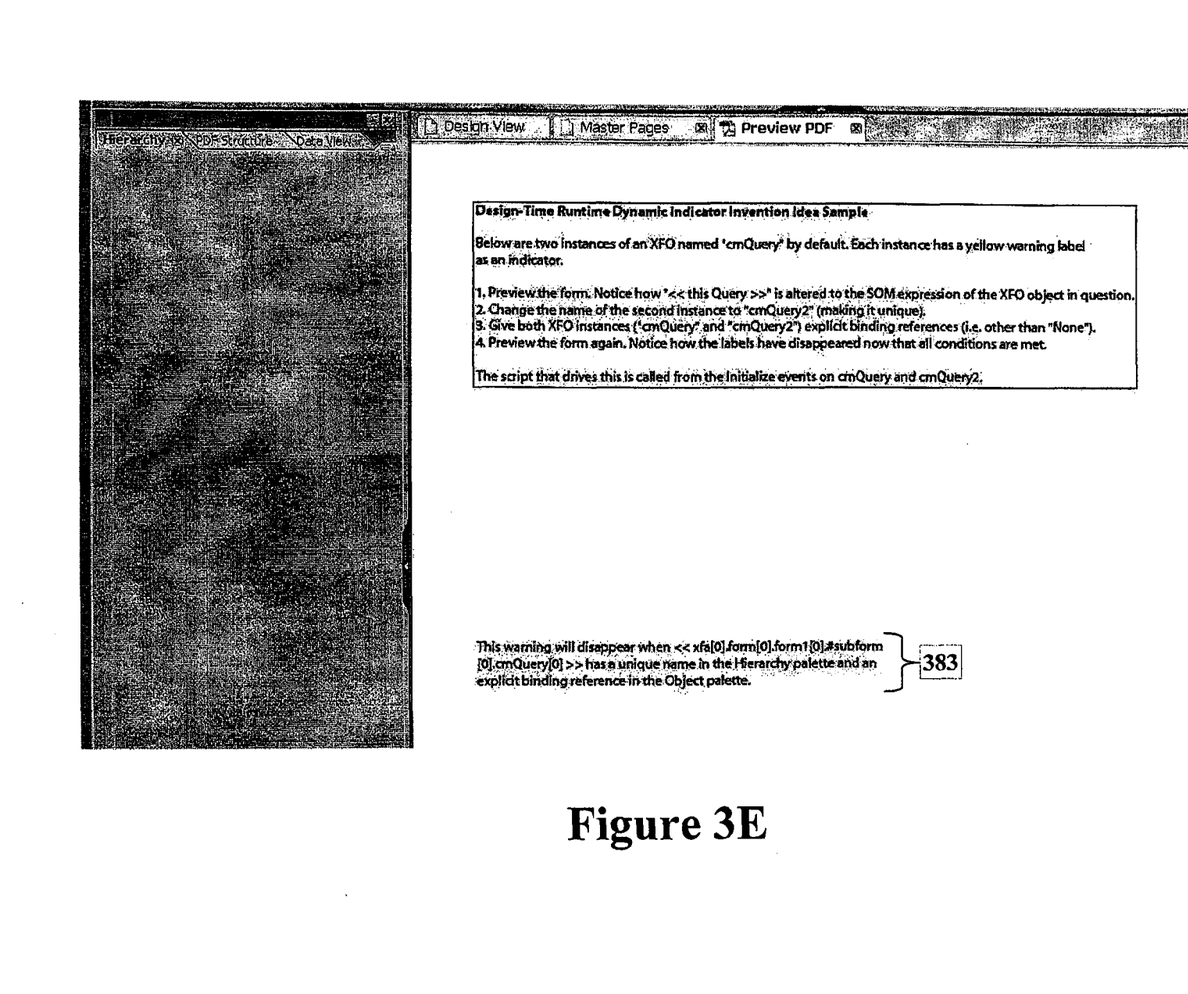
FIG. 3E illustrates a preview rendering of the form being designed in FIG. 3C after all the errors associated with the first query object have been remedied.
Figure 3F:
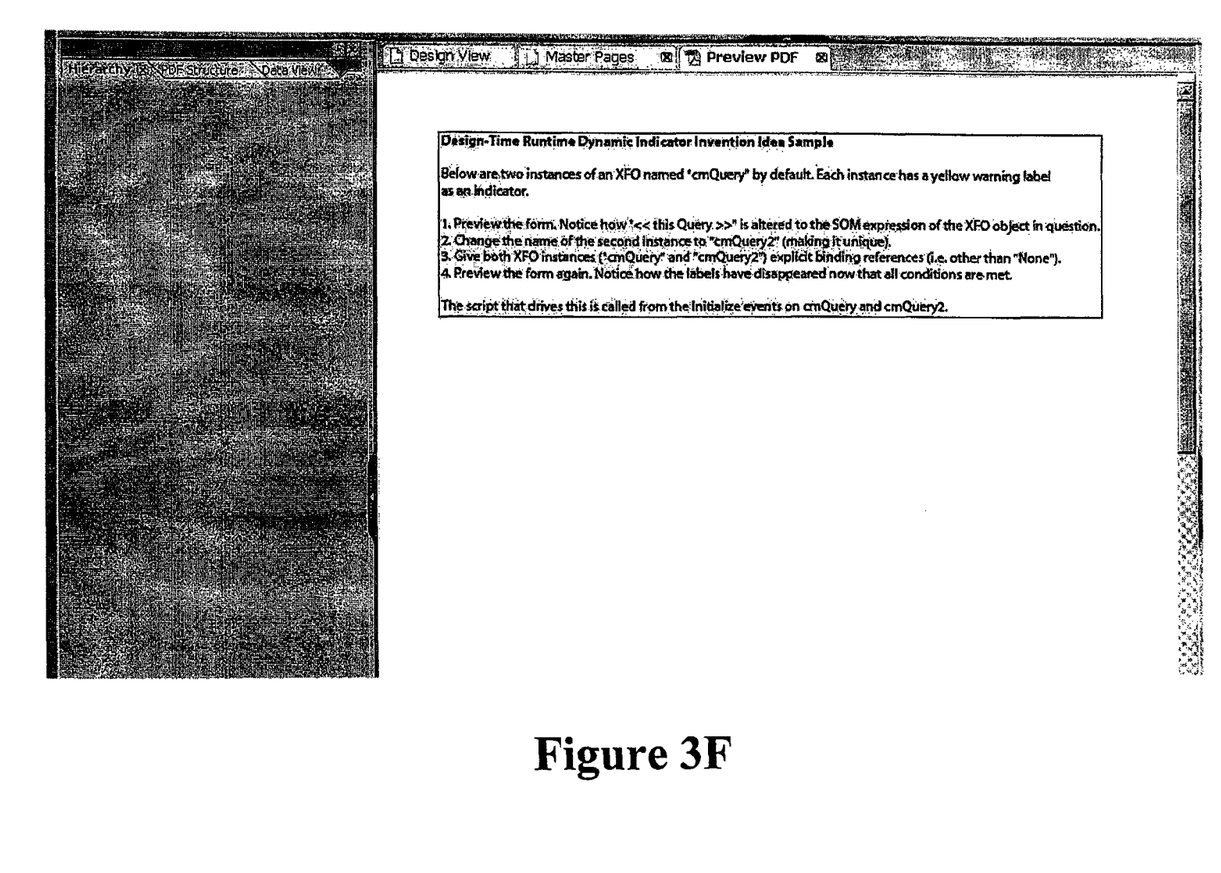
FIG. 3F illustrates a preview rendering of the form being designed in FIG. 3C after all the errors associated with the both query objects have been remedied.

If a binding is given to the TestQuery object 322 in FIG. 3C and then the XFA is previewed using the preview tab 361, only a single warning message 383 appears as illustrated in FIG. 3E. No warning message is displayed for the TestQuery object in FIG. 3E since that object now has both a unique name and an assigned binding. Finally, if a binding is given to the second cmQuery object 332 then no warning message will be displayed as illustrated in FIG. 3F. Note that the name of the name of the cmQuery object 332 in FIG. 3C did not need to be changed since the default name assigned to the object is now a unique name.

Usage in Other Object-Oriented Programming Environments

The techniques set forth above can be used in any object-oriented development environment to reduce development time and increase reliability. Note the techniques are especially valuable in visual programming environments such as the form designer of FIG. 3A since the warning message may be prominently both during development time and during debug/execution time.

Figure 4:
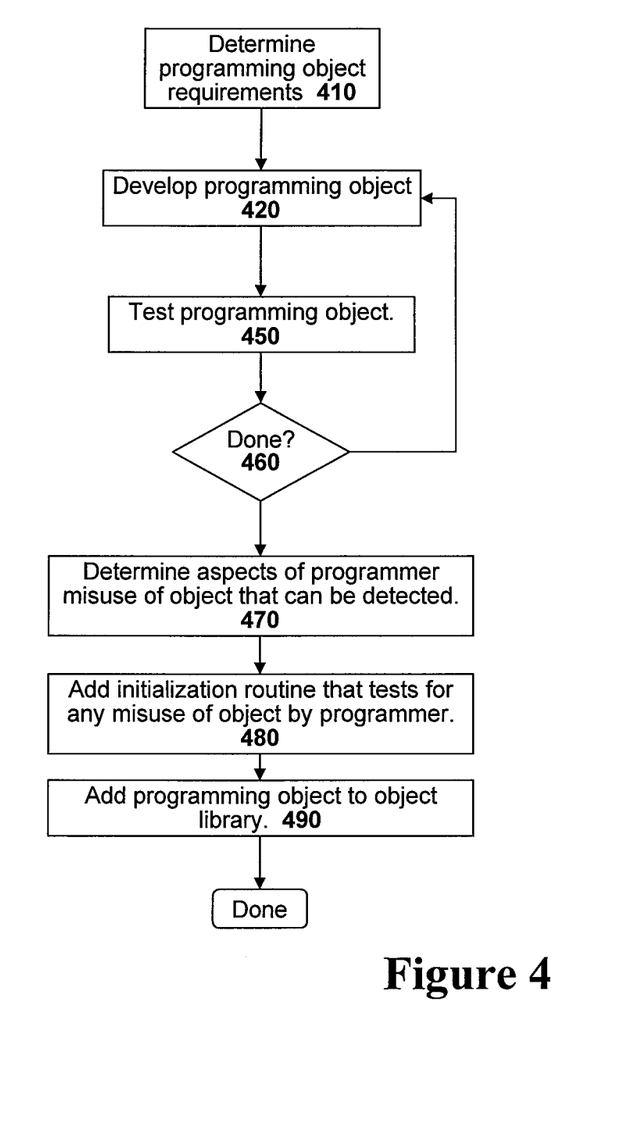
FIG. 4 illustrates a high-level flow diagram describing how self-regulating objects may be created in other object-orient environments.

FIG. 4 illustrates how the techniques can be used in other object-oriented environments. Initially, a programmer will determine the requirements for a desired programming object to be created for re-use at stage 410. Next, the programmer goes through the iterative programming steps of programming and testing the programming object in stages 420, 450, and 460.

Once the programming object has been completed, the creator of the object should then determine the various different manners in which another programmer using the programming object may accidently misuse the object at stage 470. For example, are there required values that need to initialized by a programmer or designer before the object is first used as in the unique object name and binding as set forth in the previous section? Are there any data values that have been set outside of allowable ranges?

After creating a list of the various detectable ways in which the user of a programming object may use it incorrectly at stage 470, the programmer then creates an initialization routine that will test for all of these possible accidental programming errors at stage 480. If any usage errors are detected, then the programming object should display some sort of message that will convey the nature of the programming error. Finally, the completed programming object may then be placed into an object library at stage 490.

The preceding description is intended to be illustrative, and not restrictive. For example, although the teachings are mainly disclosed with reference to an embodiment wherein JavaScript code is embedded within eXtensible Mark-up Language (XML) code, the teachings may be applied to any other object-oriented programming language and associated set of development tools. Furthermore, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72(b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A computer implemented method in an object-oriented programming environment, said method comprising:
   receiving an invocation of a programming object;
   executing an initialization routine included within said programming object, said initialization routine testing for one or more known conditions indicating said programming object has been used incorrectly, wherein one of said one or more known conditions includes a lack of an object binding; and
   displaying a message based on any of said one or more known conditions being detected as a result of said execution of said initialization routine in said programming object, wherein said displaying displays a message indicating proper programming usage of said programming object.

2. The computer implemented method as set forth in claim 1 wherein said displaying displays information specifying the detected one or more known condition.

3. The computer implemented method as set forth in claim 1 wherein said displaying alters a visual appearance of said programming object.

4. The computer implemented method as set forth in claim 1, wherein one of said one or more known conditions comprises a non-unique object name.

5. The computer implemented method as set forth in claim 1, wherein one of said one or more known conditions comprises an improperly initialized value.

6. A programming development environment for object-oriented programming, said programming development environment comprising:
   a processor of a machine;
   an object-oriented development tool;
   a storage device storing a library of programming objects, a programming object of said programming objects including an initialization routine for testing for one or more known conditions indicating that said programming object has been used incorrectly, the one or more known conditions including a lack of an object binding; and
   a preview mode for testing, using the processor, programs developed in said object-oriented development tool, said preview mode displaying a message from said programming object if any of said one or more known conditions is detected as a result of said execution of said initialization routine in said programming object, the message indicating proper programming usage of said programming object.

7. The programming development environment as set forth in claim 6 wherein said preview mode displays specific information specifying the detected known condition if any of said one or more known conditions is detected.

8. The programming development environment as set forth in claim 6 wherein said preview mode displays an altered a visual appearance of said programming object in a development tool if any of said one or more known conditions is detected.

9. The programming development environment as set forth in claim 6, wherein one of said one or more known conditions comprises a non-unique object name.

10. The programming development environment as set forth in claim 6, wherein one of said one or more known conditions comprises an improperly initialized value.

11. A non-transitory computer-readable medium comprising a set of instructions that, when executed, implement operations in an object-oriented environment, the operations comprising:
    receiving an invocation of a programming object;
    executing an initialization routine included within said programming object, said initialization routine testing for one or more known conditions indicating said programming object has been used incorrectly, wherein one of said one or more known conditions includes a lack of an object binding; and
    displaying a message based on any of said one or more known conditions being detected as a result of said execution of said initialization routine in said programming object, wherein said displaying displays a message indicating proper programming usage of said programming object.

12. The non-transitory computer-readable medium as set forth in claim 11, wherein said method further comprises:
    displaying specific information specifying the detected known condition if any of said one or more known conditions is detected.

13. The non-transitory computer-readable medium as set forth in claim 11, wherein said method further comprises:
    altering a visual appearance of said programming object in a development tool if any of said one or more known conditions is detected.

14. The non-transitory computer-readable medium as set forth in claim 11, wherein one of said one or more known conditions comprises a non-unique object name.

15. The non-transitory computer-readable medium as set forth in claim 11, wherein one of said one or more known conditions comprises an improperly initialized value.

* * * * *